United States Patent [19]

Freeland

[11] Patent Number: 4,923,654

[45] Date of Patent: May 8, 1990

[54] BLOWING AGENT FOR EXPANDABLE POLYMERIC FOAMS

[75] Inventor: James F. Freeland, Newport Beach, Calif.

[73] Assignee: Dolco Packaging Corporation, Pico Rivera, Calif.

[21] Appl. No.: 205,402

[22] Filed: Jun. 9, 1988

[51] Int. Cl.$^5$ .......................... C08J 9/14; B29C 67/22
[52] U.S. Cl. ............................... 264/53; 264/DIG. 5; 521/60; 521/139
[58] Field of Search .......................... 264/53, DIG. 5; 521/139, 60

[56] References Cited

U.S. PATENT DOCUMENTS 4,528,300 7/1985 Park ............................. 264/DIG. 5
4,727,093 2/1988 Allen et al. ....................... 264/53 X Primary Examiner—Philip Anderson
Attorney, Agent, or Firm—Nilsson, Robbins, Dalgarn, Berliner, Carson & Wurst

[57] ABSTRACT

A volatile foaming agent for thermoplastic foam is a blend of about 65 to 75 weight percent chlorodifluoromethane and from about 25 to 35 weight percent pentane.

18 Claims, No Drawings

BLOWING AGENT FOR EXPANDABLE POLYMERIC FOAMS

FIELD OF THE INVENTION

This invention relates generally to a process for making expandable thermoplastic resin compositions, and more particularly to a blowing agent dispersed in such compositions which is capable of expanding to form a foamed thermoplastic sheet in a manner which is environmentally acceptable.

BACKGROUND OF THE INVENTION

It is known to make cellular or foamed plastic masses by incorporating a volatile organic liquid, which volatilizes under the action of heat to form a gas, with a thermoplastic material and thereafter heating the material at elevated temperatures whereby the vapor of the volatile liquid expands the thermoplastic material to form a cellular mass, i.e., a foamed sheet. For example, expandable styrene polymer particles containing 1- to 20-weight percent of a volatilizable expanding agent such as propane, butane, pentane, methylchloride or a variety of chlorofluorocarbon compounds are known. These expandable styrene polymer particles produce/pre-expanded, cellular polymers or foams by heating the material at a temperature above the softening point of the polymer. Such techniques include the mixture of the polymer granules with the blowing agent, and the subsequent extrusion of the heat plasticised mixture to form a sheet which is then employed for packaging processes either as a flat sheet or formed by a heat fabrication technique to provide a desired shaped foamed article.

A variety of volatile blowing agents have been employed in the preparation of such foams. For example, lower liquid alkyl hydrocarbons have been employed in the blowing of polystyrene foams, but such hydrocarbons are flammable and for this reason elaborate and expensive precautions must be taken when it is used. In addition, when a significant amount of hydrocarbon residue remains in the product, the product's usefulness in certain applications is limited.

Thus, the blowing agents used in the production of such foams have usually been saturated chlorofluorocarbon (CFC) compounds such as dichlorodifluoromethane. However, saturated chlorofluorocarbons are suspected of destroying the earth's protective ozone layer by migrating through the troposphere to the stratosphere and catalyzing ozone-destroying chain reactions. Thus, it has been a desideratum to obtain a volatile blowing agent compound or mixture which is not damaging in the atmosphere, yet provides a useful blowing effect.

As mentioned above, hydrocarbon vapors have significant problems with respect to flammability, which render the use of any significant amount of such vapors inordinately expensive.. While unsaturated chlorofluorocarbons are much less harmful to the ozone layer, such compounds will not always blow properly so as to produce a usable product. While mixtures of hydrocarbons and chlorofluorocarbons have been proposed, a safe, effective blowing agent has yet to be produced, prior to this invention.

SUMMARY OF THE INVENTION

In accordance with the present invention, there is provided an improvement in a process for the preparation of a thermoplastic foam, which comprises the blending of a thermoplastic resin and a blowing agent which includes a mixture comprising from about 50- to about 75-weight percent chlorodifluoromethane and from about 25 to about 50 weight percent of a lower alkyl hydrocarbon, preferably selected from the group consisting of butane and pentane. Preferably, the mixture comprises from about 25 to about 35 weight percent pentane and 65 to 75 percent chlorodifluoromethane. Most preferably, the blowing agent comprises 30 percent pentane and about 70 percent chlorodifluoromethane. The terms butane and pentane as used herein include the straight chain hydrocarbons and all isomers thereof. Chlorodifluoromethane is known commercially as refrigerant 22, HCFC-22 or Freon 22. The process includes the steps of extruding the blended resin/blowing agent mixture to form a foamed sheet, and thermoforming the sheet to form a molded article.

The blowing agent of the invention provides significant advantages apart from the fact that the blowing agent is not damaging to the ozone layer. Specifically, while polymer foams blown with Freon 11 or Freon 12 must be aged at least 72 hours up to two weeks before it may be formed or molded, polystyrene foams made with the blowing agent of the invention can be used after a storage period as short as 24 hours. In addition, the mixture provides a significantly increased storage life of the sheet, that is, the time which may elapse prior to the use of the sheet in the product-forming step. Further, the mixture of the invention permits up to 25% reduction in the amount of gas required, as opposed to dichlorodifluoromethane (Freon 22) alone, for the production of virtually identical foamed polymers. In addition, the use of 30% butane or pentane in the mixture does not present a significant flammability problem and thus the added expense usually associated with the use of flammable hydrocarbons is not required.

DESCRIPTION OF THE PREFERRED EMBODIMENT

Commercial foam operations for making sheet foam or boardstock foam are known, and the use of the direct-injection process for introducing a blowing agent into the polymer to be expanded is adaptable to the process of the present invention.

In the process, virgin plastic pellets or repelletized reclaimed scrap foam, nucleating agents and miscellaneous additives are fed into the hopper of an extruder. The HCFC-22/pentane or butane blowing agent is metered under high pressure directly into the melt section of the extruder. The mixture of the blowing agent and resin is extruded through a circular die for sheet foam production. As the melt exits from the high pressure of the extruder, the blowing agent volatilizes and causes a three-fold expansion of the extruded plastic. The extruded foam is pulled over a drum-like sizing mandrel, cooled and collected on rolls for use in sheet form or for subsequent thermoforming into specific articles. Boardstock foam is made with specially designed slit dies and post-extrusion shaping equipment, but the basic concept of the direct injection of the physical blowing agent is the same as in sheet foam extrusion.

In examples of the use of the HCFC-22/pentane blowing agent, extrusion was begun by moving Dow 685D general purpose polystyrene pellets, hydrocerol or talc as a nucleating agent and a coloring ingredient to respective feed hoppers. Each raw material was then metered into the extruder feed stream by an independent feeder. The feed stream moves by conveyor action and passes through a magnetic filter to remove any foreign metal before it enters the throat of the primary extruder. A wide variety of nucleating agents may be added for cell formation, such as talc or indigo, and such nucleating agents are known in the art.

The primary extruder mixes and moves the plastic feed stream along the extruder barrel by a rotating screw action. Inside the primary extruder, the stream is heated by the screw action and by external heaters to melt the feed stream. As the melted plastic in a gel form is forced toward the end of the extruder, the pressure increases to about 3000 to 4000 psi and the HCFC-22/pentane blowing agent is injected into the gel. The blowing agent and gel are further mixed and compressed before leaving the primary extruder. The gel leaves the primary extruder and passes through a screen filter which removes contamination or extraneous material and then the gel moves between the primary and secondary extruder through a cross-over pipe which is heated to keep the gel in a melted state.

In the secondary extruder, the gel undergoes mixing. Heating and cooling controls are required to remove the heat generated by the screw action and to maintain a constant temperature. The gel is cooled to the optimal foaming temperature as it approaches the die. As the plastic is extruded through the die, the blowing agent vaporizes, causing the foaming action and cooling the gel to a solid sheet form.

The foamed sheet is pulled away from the die and stretched over a forming object called a mandrel in a method known as an S-Wrap. The forming mandrel size determines the specific sheet size. The mandrel also assists in cooling the sheet and prevents unwanted sheet shrinkage. As the foam sheet leaves the mandrel, it is slit to make handling easier. After passing through the S-Wrap, the sheet is wound into roll form by a winder, and stored for an aging period. This aging period is required to allow the material to equilibrate before thermoforming to prevent over-foaming by allowing some of the blowing agent to escape from the sheet.

In the formation of foamed objects, rolls of aged foam are brought to the thermoforming area and placed on an unwind stand. This stand feeds the sheet to the thermoformer as required by unrolling it. The sheet is carried through the thermoformer by side chains. The sheet is first pulled through an oven, in which it is heated to make the sheet soft and flexible. Next, the sheet is formed into the product shape by a stamping action in molds. The molds also cool the foamed sheet to freeze the shape of the product. Finally, the formed sheet is pushed into a trim station where the product is cut out of the sheet with trim dies. Scrap material generated by the trimming operation falls to a grinder and is subsequently blown to the regrinding storage area, where it will later be reused by being mixed with fresh resin to be recycled through the process.

The use of the blowing agent of the present invention provides significant advantages. First, with respect to the potential effect on the environment, the HCFC-22/pentane blend has an ozone depletion potential of less than 0.05, as compared to 0.9 for CFC-12. Thus, while the ozone depletion potential for CFC-11 is 100%, and that of CFC-12 is 90%, the ozone depletion potential for the HCFC-22/pentane mixture of the invention is but 3.5%. In addition, the greenhouse effect potential for HCFC-22 is 0.07 as compared with 1.0 for CFC-12.

Further testing was done with respect to the residue of the blowing agent in single polystyrene foam food containers as a function of time. This residue is particularly important due to the fact that the Food and Drug Administration requires that no more than five ppm of the blowing agent be present in any container which is exposed to food. The CFC-12 blowing agent residue was found to be 1.6% one week after extrusion, 0.12% after three weeks, 23 ppm after six weeks and 453 ppb after nine weeks. With respect to the blowing agent of the invention, the residue was found to be less than one part per billion one week after extrusion, and the residue at three weeks was below the level of detection. The half-life of the blend of the invention in a single container is 3 hours, as opposed to a half-life of 89 hours for CFC-12.

Further, the use of the HCFC-22/pentane blend offers advantages not found in either of the gases when used separately. The HCFC-22 alone is too volatile to be used practically as a blowing agent, and pentane is too flammable. However, in the 65 to 75%/25 to 35% mixture of the invention both the volatility and flammability of the blowing agent is well within practical limits.

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein they are intended in a descriptive sense and not for purposes of limitation.

I claim:

1. In a process for the preparation of a thermoplastic foam comprising blending a thermoplastic resin and a volatile foaming agent, the improvement comprising employing as the volatile foaming agent a mixture comprising from about 50 to about 75 weight percent chlorodifluoromethane and from about 25 to about 50 weight percent of a hydrocarbon selected from the group consisting of butane and pentane.

2. The process of claim 1 wherein the volatile foaming agent comprises about 65 to about 75 weight percent chlorodifluoromethane and about 25 to about 35 weight percent of the hydrocarbon.

3. The process of claim 1 wherein the volatile foaming agent comprises about 70 weight percent chlorodifluoromethane and about 30 weight percent of the hydrocarbon.

4. In a process for the preparation of a thermoplastic foam comprising blending a thermoplastic resin and a volatile foaming agent, the improvement comprising employing as the volatile foaming agent a mixture comprising from about 50 to about 75 weight percent chlorodifluoromethane and from about 25 to about 50 weight percent pentane.

5. The process of claim 4 wherein the volatile foaming agent comprises about 65 to about 75 weight percent chlorodifluoromethane and about 25 to about 35 weight percent pentane.

6. The process of claim 4 wherein the volatile foaming agent comprises about 70 weight percent chlorodifluoromethane and about 30 weight percent pentane.

7. A process for the preparation of a thermoplastic, foamed molded article, comprising blending a thermoplastic resin and a volatile foaming agent comprising from about 50 to about 75 weight percent chlorodifluoromethane and from about 25 to about 50 weight percent of a hydrocarbon selected from the group consisting of butane and pentane;

extruding the blend to form a foamed sheet; and thermoforming the sheet into the article.

8. The process of claim 7 wherein the volatile foaming agent comprises about 65 to about 75 weight percent chlorodifluoromethane and about 25 to about 35 weight percent of the hydrocarbon.

9. The process of claim 7 wherein the volatile foaming agent comprises about 70 weight percent chlorodifluoromethane and about 30 weight percent of the hydrocarbon.

10. A process for the preparation of a thermoplastic, foamed molded article, comprising blending a thermoplastic resin and a volatile foaming agent comprising from about 50 to about 75 weight percent chlorodifluoromethane and from about 25 to about 50 weight percent pentane;

extruding the blend to form a foamed sheet; and thermoforming the sheet into the article.

11. The process of claim 10 wherein the volatile foaming agent comprises about 65 to about 75 weight percent chlorodifluoromethane and about 25 to about 35 weight percent pentane.

12. The process of claim 10 wherein the volatile foaming agent comprises about 70 weight percent chlorodifluoromethane and about 30 weight percent pentane.

13. In a process for the preparation of a polystyrene foam comprising blending polystyrene resin and a volatile foaming agent, the improvement comprising employing as the volatile foaming agent a mixture comprising from about 50 to about 75 weight percent chlorodifluoromethane and from about 25 to about 50 weight percent of a hydrocarbon selected from the group consisting of butane and pentane.

14. The process of claim 13 wherein the volatile foaming agent comprises about 65 to about 75 weight percent chlorodifluoromethane and about 25 to about 35 weight percent of the hydrocarbon.

15. The process of claim 13 wherein the volatile foaming agent comprises about 70 weight percent chlorodifluoromethane and about 30 weight percent of the hydrocarbon.

16. The process of claim 13 wherein the hydrocarbon is pentane.

17. The process of claim 14 wherein the hydrocarbon is pentane.

18. The process of claim 15 wherein the hydrocarbon is pentane.

* * * * *